(12) United States Patent
Miyake et al.

(10) Patent No.: US 11,899,968 B2
(45) Date of Patent: Feb. 13, 2024

(54) MAGNETIC DISK APPARATUS AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Masahisa Miyake, Ome Tokyo (JP); Kazuya Takada, Chigasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 29 days.

(21) Appl. No.: 17/689,242

(22) Filed: Mar. 8, 2022

(65) Prior Publication Data

US 2023/0088609 A1   Mar. 23, 2023

(30) Foreign Application Priority Data

Sep. 17, 2021   (JP) .................................. 2021-152184

(51) Int. Cl.
G06F 12/00 (2006.01)
G06F 3/06 (2006.01)
G11B 5/012 (2006.01)
G11B 5/54 (2006.01)
G11B 5/00 (2006.01)

(52) U.S. Cl.
CPC .......... *G06F 3/0656* (2013.01); *G06F 3/0619* (2013.01); *G06F 3/0676* (2013.01); *G11B 5/012* (2013.01); *G11B 5/54* (2013.01); *G11B 2005/001* (2013.01)

(58) Field of Classification Search
None
See application file for complete search history.

(56) References Cited

U.S. PATENT DOCUMENTS

| 9,965,397 | B2 | 5/2018 | Simionescu et al. |
| 10,720,200 | B2 | 7/2020 | Dallmann et al. |
| 2016/0299850 | A1* | 10/2016 | Budiman ................ G06F 13/16 |
| 2020/0090690 | A1* | 3/2020 | Shimokawa ......... G11B 5/4886 |
| 2020/0294540 | A1 | 9/2020 | Shimokawa |

* cited by examiner

*Primary Examiner* — Daniel D Tsui
(74) *Attorney, Agent, or Firm* — Kim & Stewart LLP

(57) ABSTRACT

According to one embodiment, a magnetic disk apparatus is provided with a magnetic disk, a buffer memory, and a control circuit. The magnetic disk has plural bands, each of which is a storage area in which data is written by the method of SMR. The control circuit receives a read request from outside. If the data requested to be read is first data of an update target stored in a first band among plural bands, the control circuit reads the first data from the first band, stores the first data in a buffer memory, and updates the first data in the buffer memory. Then, the control circuit transmits the first data in the buffer memory to the outside and writes the first data in the buffer memory to one of the plural bands.

8 Claims, 10 Drawing Sheets

MAGNETIC DISK APPARATUS AND METHOD

CROSS-REFERENCE TO RELATED APPLICATIONS

This application is based upon and claims the benefit of priority from Japanese Patent Application No. 2021-152184, filed on Sep. 17, 2021; the entire contents of which are incorporated herein by reference.

FIELD

Embodiments described herein relate generally to a magnetic disk apparatus and a method.

BACKGROUND

Recently, a technique called Shingled Magnetic Recording (SMR) has been developed as a method to write data to a magnetic disk. According to SMR, when data is to be written to a magnetic disk, the data corresponding to a subsequent track is written so as to be overlapped with part of the data corresponding to one already-written track. As a result, the width of a track (in other words, track pitch) becomes narrower than the width of a write element, and the recording density of data with respect to the magnetic disk is improved.

In SMR, the track pitch is narrower than the write element. Therefore, in order to prevent accidental erase of already written data, write of new data is executed sequentially in terms of position with respect to the magnetic disk. More specifically, in SMR, the magnetic disk is divided into plural partial areas in a radial direction, and data is written to each of the partial areas sequentially in terms of position. The partial areas are also referred to as bands. The write pattern of carrying out write sequentially in terms of position is referred to as sequential write. The band-unit data stored in each band is referred to as band data.

When part of a band data stored in a band is to be rewritten, the band data is read from the band and stored in a buffer memory, and rewrite with respect to the band data is executed in the buffer memory. Then, the band data after the rewrite is written to a band.

DETAILED DESCRIPTION

According to the present embodiment, the magnetic disk apparatus is provided with a magnetic disk, a buffer memory, and a control circuit. The magnetic disk has plural bands, each of which is a storage area in which data is written by the method of SMR. The control circuit receives a read request from outside. If the data requested to be read is first data of an update target stored in a first band among plural bands, the control circuit reads the first data from the first band, stores the first data in a buffer memory, and updates the first data in the buffer memory. Then, the control circuit transmits the first data in the buffer memory to the outside and writes the first data in the buffer memory to one of the plural bands.

Hereinafter, a magnetic disk apparatus a method according to the embodiment will be described in detail with reference to accompanying drawings. Note that the present invention is not limited by this embodiment.

Embodiment

Techniques according to the embodiment can be applied to a magnetic disk apparatus provided with one or more actuator systems. Hereinafter, a case in which the techniques according to the embodiment are applied to a magnetic disk apparatus provided with two actuator systems is described.

Figure 1:
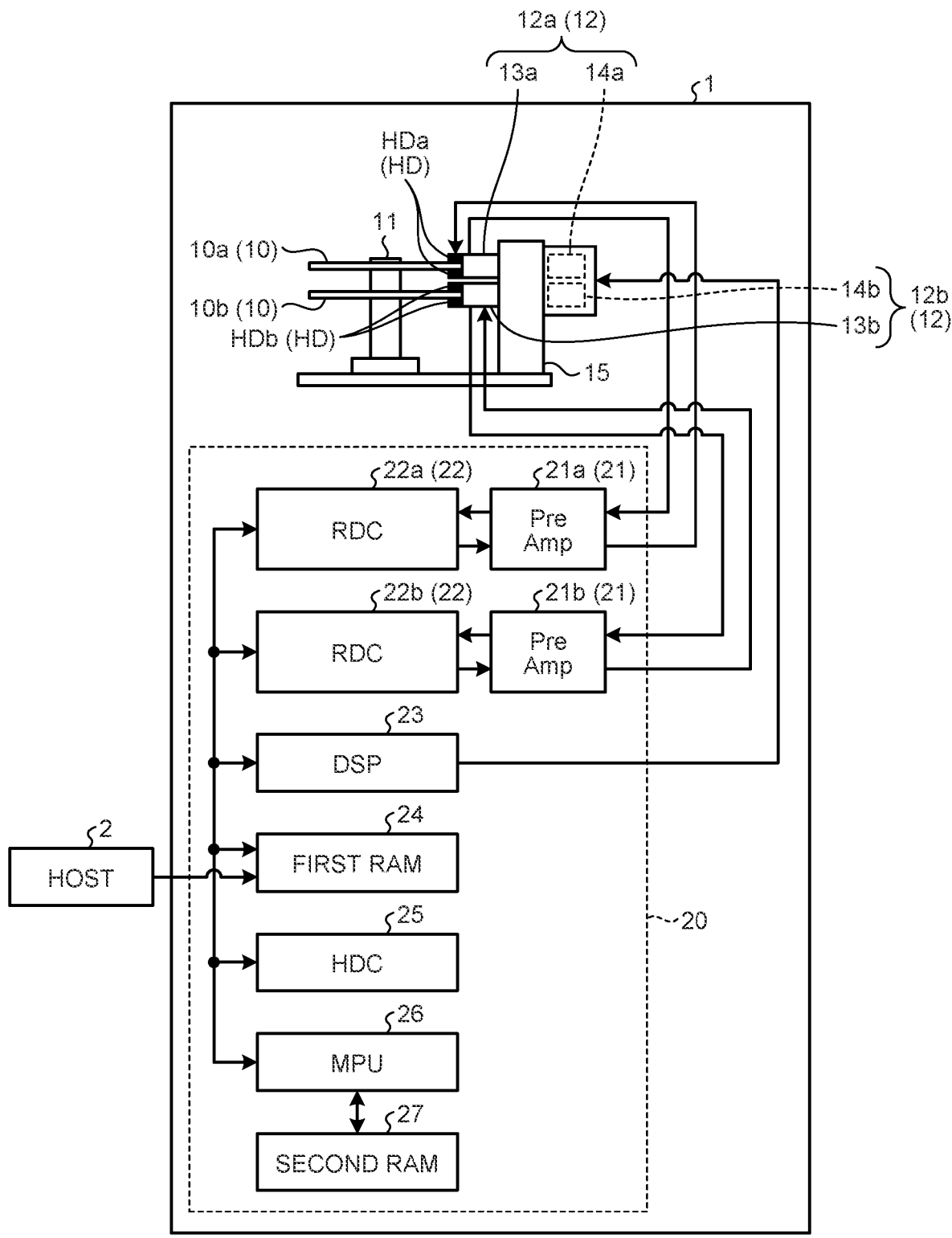
FIG. 1 is a diagram illustrating an example of a configuration of a magnetic disk apparatus according to an embodiment.

FIG. 1 is a diagram illustrating an example of a configuration of a magnetic disk apparatus 1 according to the embodiment. The magnetic disk apparatus 1 is connectable to a host 2. The standards of a communication path between the magnetic disk apparatus 1 and the host 2 are not limited to particular standards. For example, Serial Attached SCSI (SAS) may be employed as the standards of the communication path between the magnetic disk apparatus 1 and the host 2.

The host 2 corresponds to, for example, a processor, a personal computer, or a server. The magnetic disk apparatus 1 can receive access commands (read commands and write commands) from the host 2.

The magnetic disk apparatus 1 is provided with plural magnetic disks 10. In this case, for example, the magnetic disk apparatus 1 is provided with two magnetic disks 10a and 10b. The two magnetic disks 10 are integrally rotated about a rotation shaft 11 by an unillustrated spindle motor.

Recording surfaces on which data can be recorded are formed respectively on a front surface and a back surface of each of the magnetic disks 10. In other words, the two magnetic disks 10 have four recording surfaces. In order to access each of the four recording surfaces, the magnetic disk apparatus 1 is provided with four magnetic heads HD corresponding to the four recording surfaces.

One pair of first magnetic heads HDa among the four magnetic heads HD is opposed to one pair of recording surfaces of the first magnetic disk 10a. Another pair of second magnetic heads HDb among the four magnetic heads HD is opposed to one pair of recording surfaces of the second magnetic disks 10b. Each magnetic head HD executes access, in other words, data write and data read with respect to the recording surface opposed to the magnetic head. Each magnetic head HD carries out data write by using a write element provided in the magnetic head. Each magnetic head HD carries out data read by using a read element provided in the magnetic head.

The magnetic disk apparatus 1 is provided with two actuator systems 12, which are individually driven. A first actuator system 12a among the two actuator systems 12 is provided with an actuator arm 13a and a voice coil motor 14a. The pair of first magnetic heads HDa is attached to a distal end of the actuator arm 13a.

A second actuator system 12b among the two actuator systems 12 is provided with an actuator arm 13b and a voice coil motor 14b. The pair of second magnetic heads HDb is attached to a distal end of the actuator arm 13b.

The two actuator systems 12 can individually rotate about a rotation shaft 15. The rotation shaft 15 is provided at a position parallel to the rotation shaft 11 and is separated from the rotation shaft 11. The voice coil motor 14a rotates the first actuator system 12a within a predetermined range about the rotation shaft 15. Accordingly, the pair of first magnetic heads HDa is subjected to relative movement in a radial direction with respect to each recording surface of the first magnetic disk 10a. The voice coil motor 14b rotates the second actuator system 12b within a predetermined range about the rotation shaft 15. Accordingly, the pair of second magnetic heads HDb is subjected to relative movement in a radial direction with respect to each recording surface of the second magnetic disk 10b.

Note that the magnetic disk apparatus 1 may be provided with three or more magnetic disks 10. In such a case, the distal end of the actuator arm 13a provided in the first actuator system 12a is provided with plural first magnetic heads HDa for accessing the recording surfaces provided on the magnetic disks 10, which are included in the three or more magnetic disks 10; and the distal end of the actuator arm 13b provided in the second actuator system 12b is provided with plural second magnetic heads HDb for accessing the recording surfaces provided on the other magnetic disks 10, which are included in the three or more magnetic disks 10.

The magnetic disk apparatus 1 is further provided with a control circuit 20. The control circuit 20 communicates with the host 2 via an interface such as a connection pin provided on a chassis (not illustrated) of the magnetic disk apparatus 1 for external connection. The control circuit 20 controls each unit of the magnetic disk apparatus 1 in response to commands, etc. from the host 2. As described above, the commands from the host 2 include a write command which requests write and a read command which requests read.

The control circuit 20 has a pre-amplifier (Pre Amp) 21 and a Read Write Channel (RDC) 22 for each actuator system 12. In other words, the control circuit 20 is provided with a pre-amplifier 21a and a RDC 22a corresponding to the first actuator system 12a. Also, the control circuit 20 is provided with a pre-amplifier 21b and a RDC 22b corresponding to the second actuator system 12b.

The control circuit 20 further has a Digital Signal Processor (DSP) 23, a first Random Access Memory (RAM) 24, a Hard Disk Controller (HDC) 25, a Micro Processing Unit 26 (MPU), and a second RAM 27.

The pre-amplifier 21a amplifies signals, which have been read from the recording surface of the first magnetic disk 10a by the read element of each first magnetic head HDa, and supplies the amplified signals to the RDC 22a. Also, the pre-amplifier 21a amplifies signals, which have been supplied from the RDC 22a, and supplies the amplified signals to the first magnetic head HDa, which is opposed to the recording surface serving as a write destination.

The RDC 22a encodes the data, which is to be written to the first magnetic disk 10a, and supplies the encoded data to the pre-amplifier 21a as signals. Also, the RDC 22a decodes the signals, which have been read from the first magnetic disk 10a and supplied from the pre-amplifier 21a. The RDC 22a outputs the decoded signals to the HDC 25 as digital data.

The pre-amplifier 21b amplifies signals, which have been read from the second magnetic disk 10b by the read element of each second magnetic head HDb, and supplies the amplified signals to the RDC 22b. Also, the pre-amplifier 21b amplifies signals, which have been supplied from the RDC 22b, and supplies the amplified signals to the second magnetic head HDb.

The RDC 22b encodes the data, which is to be written to the second magnetic disk 10b, and supplies the encoded data to the pre-amplifier 21b as signals. Also, the RDC 22b decodes the signals, which have been read from the second magnetic disk 10b and supplied from the pre-amplifier 21b. The RDC 22b outputs the decoded signals to the HDC 25 as digital data.

The DSP 23 carries out positioning control of each of the magnetic heads HD such as seeking and following by controlling the spindle motor and the voice coil motor 14.

The first RAM 24 is a buffer memory in which data, etc. transferred between the host 2 and the magnetic disks 10 is temporarily stored. For example, the data received from the host 2 is written to any of the magnetic disks 10 via the first RAM 24. Also, the data read from the two magnetic disks 10 is output to the host 2 via the first RAM 24. Details of the function of the first RAM 24 as a buffer memory will be described later.

The first RAM 24 includes a memory capable of operating at high speed. Also, the first RAM 24 is, for example, a dual port memory capable of carrying out plural simultaneous accesses. Note that the first RAM 24 may be a single port memory. The first RAM 24 may be built of, for example, a Dynamic Random Access Memory (DRAM), a Static Random Access Memory (SRAM), or a combination thereof. Note that the position at which the first RAM 24 is provided does not have to be in the control circuit 20. The first RAM 24 may be provided outside the control circuit 20.

The HDC 25 executes communication with the host 2. The HDC 25 stores the data, which has been received from RDCs 22a and 22b, in the first RAM 24. Then, the HDC 25 transfers the data from the RDCs 22a and 22b, which is stored in the first RAM 24, to the host 2.

Also, the HDC 25 stores the data, which has been received from the host 2 together with a write command, in the first RAM 24. Then, the HDC 25 outputs the data from the host 2, which is stored in the first RAM 24, to the RDCs 22a and 22b.

The MPU 26 is a processor, which executes a firmware program. The MPU 26 analyzes the commands from the host 2, which have been received by the HDC 25, and carries out monitoring of the state of the magnetic disk apparatus 1, control of each unit of the magnetic disk apparatus 1, etc.

The second RAM 27 functions as, for example, an area in which firmware and various management information is stored. The second RAM 27 includes a volatile memory, a non-volatile memory, or a combination thereof. The volatile memory may be, for example, a SRAM, a DRAM, or a combination thereof. The non-volatile memory may be, for example, a flash memory.

As described above, the pair of first magnetic heads HDa is provided at the distal end of the first actuator system 12a, and the pair of second magnetic heads HDb is provided at the distal end of the second actuator system 12b, which is controlled independently from the first actuator system 12a. Also, the pre-amplifier 21 and the RDC 22 are provided for each actuator system 12.

Accordingly, the control circuit 20 can independently control the access to the first magnetic disk 10a, which uses the first actuator system 12a and the pair of the first magnetic heads HDa, and the access to the second magnetic disk 10b, which uses the second actuator system 12b and the pair of the second magnetic heads HDb. Therefore, the control circuit 20 can execute, in parallel, the access using the first actuator system 12a and the access using the second actuator system 12b.

Figure 2:
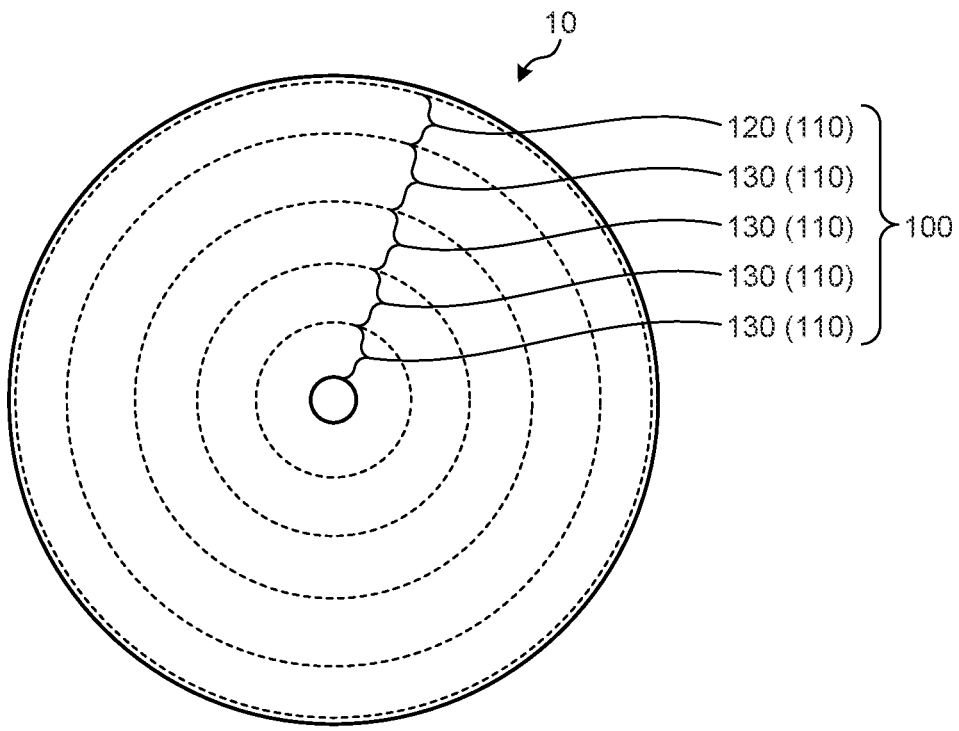
FIG. 2 is a diagram for describing a recording surface of each magnetic disk according to the embodiment.

FIG. 2 is a diagram for describing the recording surface of each magnetic disk 10 according to the embodiment. The configurations of the recording surfaces of the two magnetic disks 10 are the same. This diagram illustrates one of the front surface and the back surface of a certain magnetic disk 10.

A recording surface 100 is provided on a surface of the magnetic disk 10. The recording surface 100 is divided into plural concentric storage areas 110 having a rotation center of the magnetic disk 10 as a center thereof. In other words, the recording surface 100 is divided into the plural storage areas 110 in the radial direction. The plural storage areas 110 include one media cache area 120 and plural bands 130. Areas called guard areas in which data write is prohibited are provided between the storage areas 110. However, illustration of the guard areas is omitted in this diagram.

In the example illustrated in FIG. 2, the storage area 110, which is provided in the outermost side in the radial direction of the recording surface 100, corresponds to the media cache area 120. The position of the media cache area 120 is not limited to this. The number of the media cache area(s) 120 provided on the single recording surface 100 is not limited to one.

Also, the recording surface 100 has four bands 130 as the plural bands 130. The number of the bands 130 provided on the recording surface 100 is not limited thereto.

Figure 3:
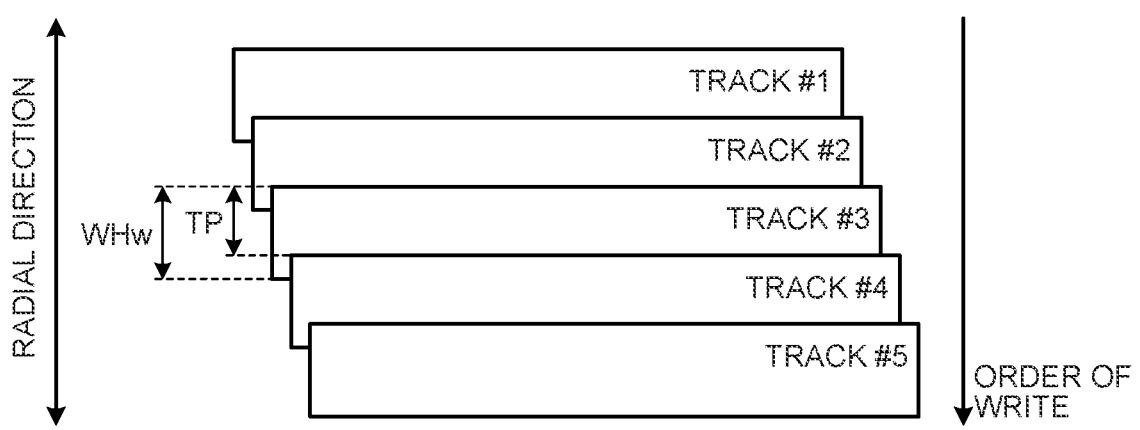
FIG. 3 is a schematic diagram for describing write of an SMR method executed in the magnetic disk apparatus according to the embodiment.

Data is written to the bands 130 by the Shingled Magnetic Recording (SMR) method. FIG. 3 is a schematic diagram for describing write of the SMR method executed in the magnetic disk apparatus 1 according to the embodiment.

According to SMR, when data written to each band 130, the data corresponding to a subsequent track is written so as to be overlapped with part of the data corresponding to one already-written track. Therefore, as illustrated in FIG. 3, a track pitch (TP) is narrower than a core width (WHw) of the write element of the magnetic head HD. As a result, the recording density thereof is improved.

Also, in SMR, in order to prevent the writing of the data of new tracks from making it difficult to read the data of already-written tracks, write in the band 130 is carried out in either one direction of the direction from the outer side of the magnetic disk 10 toward the radial-direction inside (in other words, inner side) and the opposite direction thereof. The direction of write in one band 130 is not changed during the write.

According to SMR, the track pitch is narrower than the core width WHw of the write element. Therefore, when partial data of the data of plural tracks, which have undergone write sequentially in terms of position by the SMR method, is to be subjected to rewrite, the data in the track adjacent to the track including the data of a rewrite target may be destroyed. In order to prevent such destruction of data, rewrite of data is executed in the unit of the band 130.

For example, in a state in which certain data (described as old data) is stored in a certain band 130, if new data corresponding to the old data is transmitted, the new data is temporarily stored in a storage area (for example, the media cache area 120) which is different from this band 130. Then, when a predetermined condition is satisfied, all the data in the band 130 (in other words, band data) is written to the same or another band 130. In this process, the old data included in the band data is replaced by new data. The replacement can be also described as update. Such a process of reading band data and replacing part of the band data by new data is described as an update process.

Figure 4:
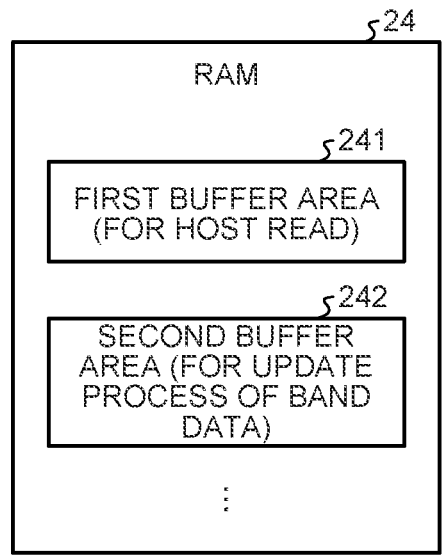
FIG. 4 is a schematic diagram for describing various areas allocated to a first RAM according to the embodiment.

The first RAM 24 also functions as a buffer memory for the update process in addition to a buffer memory of data transmitted to/from the host 2. FIG. 4 is a schematic diagram for describing various areas allocated to the first RAM 24 according to the embodiment. As illustrated in this diagram, plural areas including a first buffer area 241 and a second buffer area 242 are allocated to the first RAM 24.

The first buffer area 241 temporarily stores the data, which has been read from the magnetic disk 10 in response to a request of read by a read command from the host 2. Note that an operation corresponding to a read command from the host 2 is described as host read. In other words, the first buffer area 241 is used for host read.

The second buffer area 242 temporarily stores band data, which is a target of an update process.

Herein, techniques compared with the embodiment will be described. The techniques compared with the embodiment are described as a comparative example. In the comparative example, the control circuit individually executes the read of band data from a magnetic disk for an update process and the read of data from the magnetic disk for host read. Therefore, even if the same data serves as a target of both the update process and the host read, the control circuit reads the same data twice from the magnetic disk. Therefore, efficiency of data read from the magnetic disk is bad.

In the embodiment, in order to improve the efficiency of data read from the magnetic disk 10 compared with the comparative example, the control circuit 20 executes the read of the band data, which serves as an update target, at the timing when read of part or all of this band data is requested from the host 2. Hereinafter, the update process according to the embodiment will be described by using FIG. 5 to FIG. 7.

Figure 5:
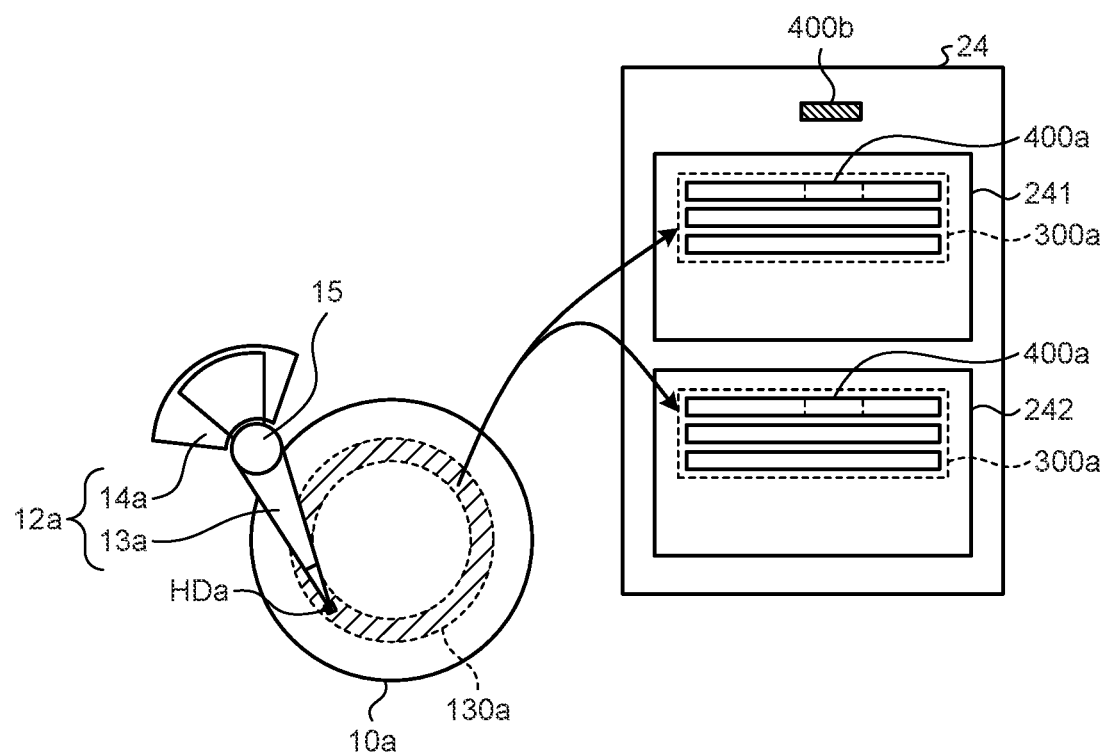
FIG. 5 is a schematic diagram for describing an operation of reading band data which is executed in the magnetic disk apparatus according to the embodiment.

FIG. 5 is a schematic diagram for describing an operation of reading band data which is executed in the magnetic disk apparatus 1 according to the embodiment.

In the example illustrated in FIG. 5, it is assumed that, in a state in which band data in a certain band 130a provided on the first magnetic disk 10a is set as an update target in advance, the host 2 has transmitted a read command, which requests read of the band data, to the magnetic disk apparatus 1. In such a case, the control circuit 20 reads band data 300a, which is stored in the band 130a, by using the first actuator system 12a. The control circuit 20 stores the band data 300a, which has been read from the band 130a, in both of the first buffer area 241 and the second buffer area 242. One of the band data 300 stored in the first buffer area 241 and the band data 300 stored in the second buffer area 242 is a copy of the other one. In other words, the control circuit 20 acquires the two pieces of band data 300 by executing read of the band data 300 from the band 130a once and copying the read band data 300, and the control circuit 20 stores one of the two pieces of band data 300 in the first buffer area 241 and stores the other one of the two pieces of band data 300 in the second buffer area 242.

At the timing before or after the read of the band data 300a, the control circuit 20 reads new data 400b, which is to rewrite the band data 300a, from, for example, the media cache area 120 of the magnetic disk 10 and stores the new data in a predetermined storage area (in this case, for example, the first RAM 24). If plural pieces of new data to rewrite the band data 300a are present, the control circuit 20 reads all the new data, which is to rewrite the band data 300a, from the magnetic disk 10 and stores the data in a predetermined storage area.

Note that the data 400b illustrated in FIG. 5 is new data which is to rewrite the band data 300a. Data 400a included in the band data 300a is the part to be rewritten by the data 400b, in other words, is old data. In the example illustrated in FIG. 5, the data 400a is the only old data to be rewritten.

Figure 6:
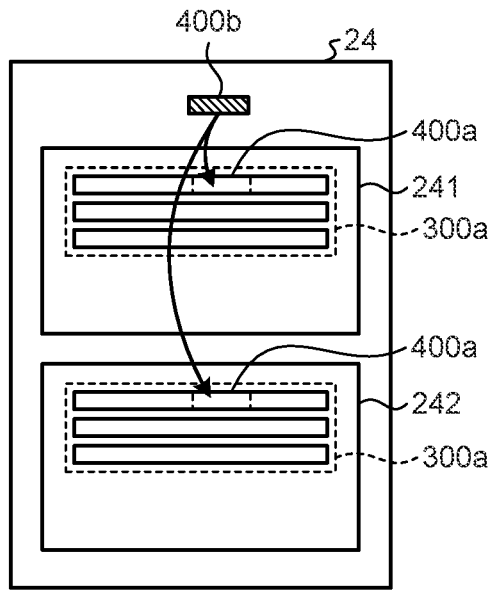
FIG. 6 is a schematic diagram for describing an operation of updating data executed in the magnetic disk apparatus according to the embodiment.

FIG. 6 is a schematic diagram for describing an operation of updating data executed in the magnetic disk apparatus 1 according to the embodiment. As illustrated in this diagram, with respect to both the band data 300a stored in the first buffer area 241 and the band data 300a stored in the second buffer area 242, the control circuit 20 replaces the data 400a by the data 400b. As a result, each of the band data 300a stored in the first buffer area 241 and the band data 300a stored in the second buffer area 242 becomes the band data of a latest state (band data 300b illustrated in FIG. 7).

Figure 7:
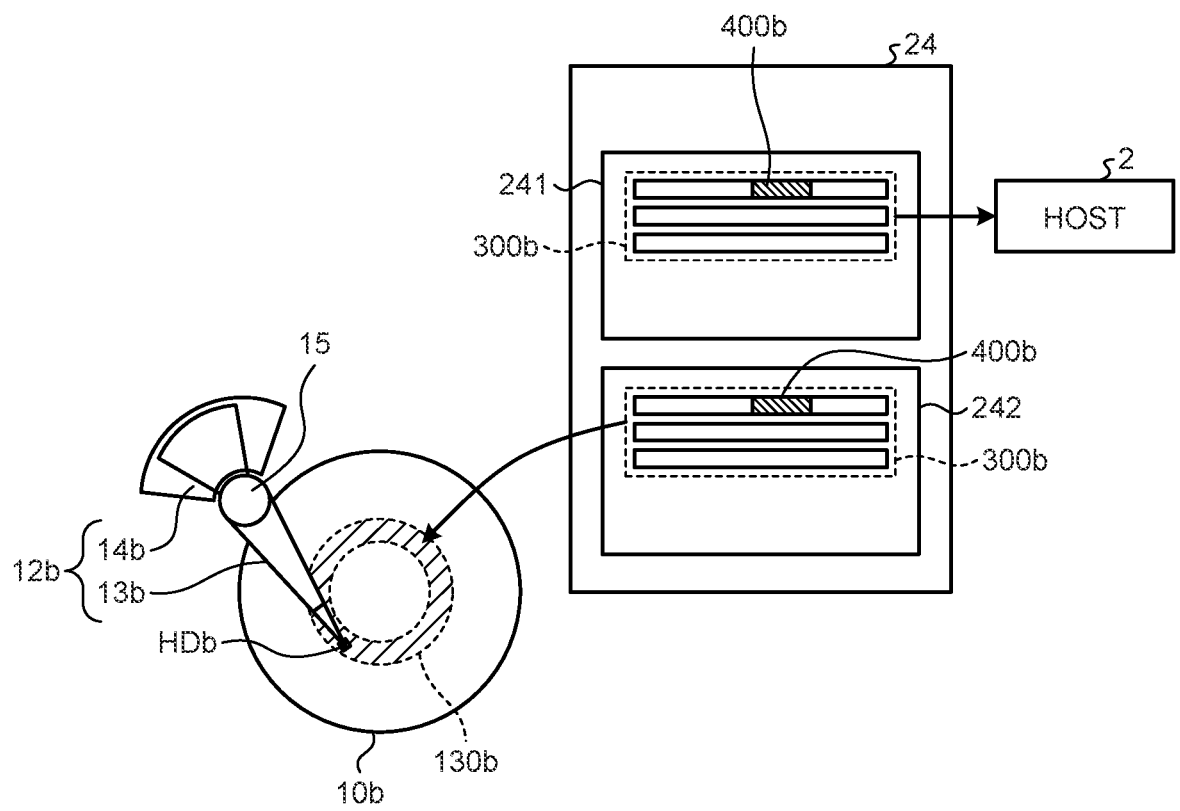
FIG. 7 is a schematic diagram for describing an operation after updating data in the magnetic disk apparatus according to the embodiment.

FIG. 7 is a schematic diagram for describing an operation after updating data in the magnetic disk apparatus 1 according to the embodiment.

The control circuit 20 transmits the band data 300b, which is in the first buffer area 241, to the host 2. Also, the control circuit 20 writes the band data 300b, which is in the second buffer area 242, to the magnetic disk 10. Herein, for example, the control circuit 20 writes the band data 300b to a certain band 130b of the second magnetic disk 10b by using the second actuator system 12b.

In this manner, when the band data 300a serving as a target of the update process serves as a target of host read, the control circuit 20 reads the band data 300a only once from the magnetic disk 10 to the first RAM 24. Then, the control circuit 20 executes update with respect to the band data 300a stored in the first RAM 24 and transmits the updated band data 300b to the host 2 or writes the updated band data 300b to the magnetic disk 10.

Therefore, according to the embodiment, the number of times of read is reduced compared with the comparative example. In other words, the efficiency of data read from the magnetic disk is improved compared with the comparative example.

The operation described in FIG. 5 of reading the band data, which is an update target and is also a host read target, once from the magnetic disk 10 is described as a shared read operation.

Note that, in the above description, the shared read operation is executed in the case in which the band data serving as an update target serves as a target of host read. The shared read operation can be executed also in a case in which part of the band data serving as an update target serves as a target of host read.

Figure 8:
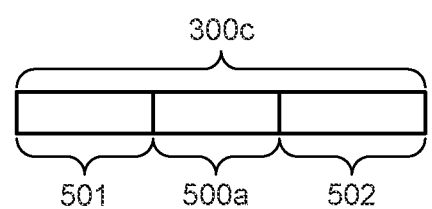
FIG. 8 is a schematic diagram for describing an example of data which serves as a target of a shared read operation in the magnetic disk apparatus according to the embodiment.

For example, as illustrated in FIG. 8, in a state in which band data 300c serves as an update target, data 500a at a center part of the band data 300c serves as a target of host read, and data 501 and data 502 are not targets of host read. In this case, a shared read operation can be executed with respect to the band data 300c. However, the data transmitted to the host 2 after the shared read operation is the data 500a, and both the data 501 and the data 502 are not transmitted to the host 2.

Figure 9:
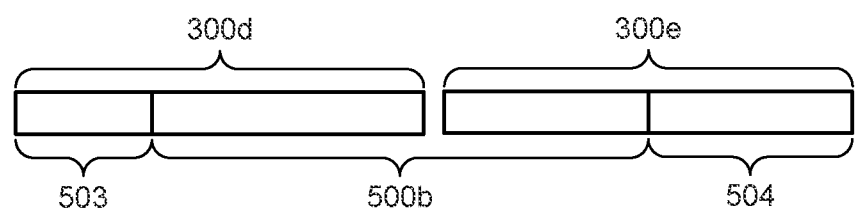
FIG. 9 is a schematic diagram for describing another example of data which serves as a target of a shared read operation in the magnetic disk apparatus according to the embodiment.

Also, for example as illustrated in FIG. 9, in a state in which both band data 300d and band data 300e serve as update targets, data 500b across a boundary of the band data 300d and the band data 300e from a middle of the band data 300d to a middle of the band data 300e serves as a target of host read, and the other part (data 503 and data 504 of FIG. 9) does not serve as a target of host read. In this case, the shared read operation can be executed with respect to the band data 300d and the band data 300e. After the shared read operation, the data 500b is transmitted to the host 2. After the shared read operation, both the data 503 and the data 504 are not transmitted to the host 2.

Figure 10:
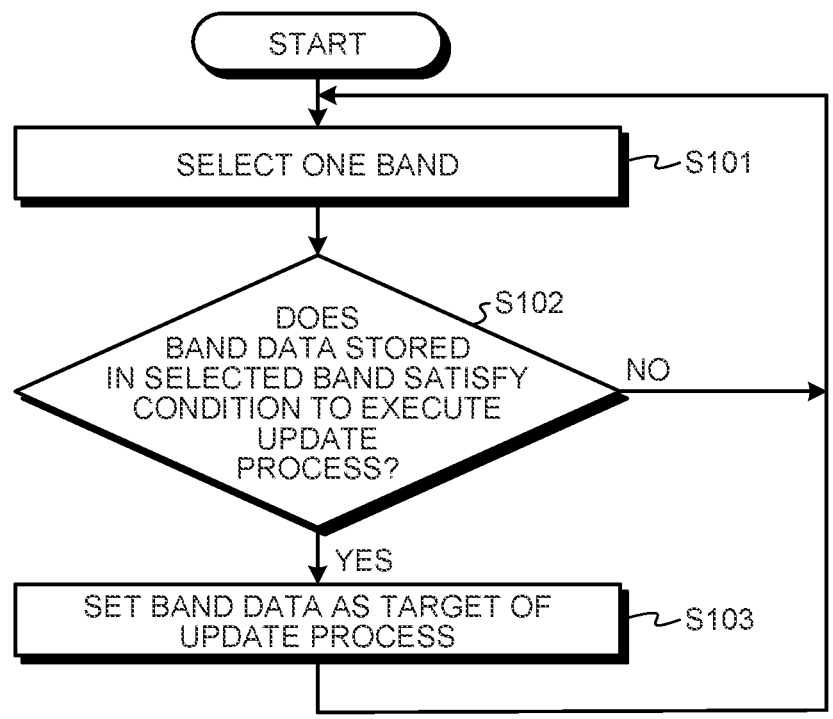
FIG. 10 is a flow chart illustrating an example of an operation of setting a target of an update process executed by the magnetic disk apparatus according to the embodiment.

FIG. 10 is a flow chart illustrating an example of an operation of setting a target of the update process executed by the magnetic disk apparatus 1 according to the embodiment.

The control circuit 20 selects one of one or more bands 130 in which data has already been written (S101). Then, the control circuit 20 determines whether the band data stored in the selected band 130 satisfies the condition(s) to execute the update process or not (S102).

The condition to execute the update process is arbitrarily set. For example, a fact that the amount of the old data, which is included in band data and to be rewritten, or the new data, which is to rewrite band data, exceeds a threshold value can be set as the condition to execute the update process.

In another example, a fact that elapsed time after band data has been written to the magnetic disk 10 exceeds a threshold value can be set as the condition to execute the update process.

Further, in another example, a fact that the number of times of occurrence of errors in read of band data exceeds a threshold value can be set as the condition to execute the update process.

If the band data stored in the selected band 130 does not satisfy the condition to execute the update process (S102: No), the control makes a transition to S101, and the control circuit 20 selects another band 130.

If the band data stored in the selected band 130 satisfies the condition to execute the update process (S102: Yes), the control circuit 20 sets the band data, which is stored in the selected band, as a target of the update process (S103). Then, the control makes a transition to S101, and the control circuit 20 selects another band 130.

In this manner, the control circuit 20 sequentially selects one or more bands 130 in which data is stored and executes the process of S102 with respect to the selected band 130, thereby searching for the band data which satisfies the condition to execute the update process. The control circuit 20 can set all of the one or more band data which satisfies the condition to execute the update process as the target of the update process by executing the loop process illustrated in FIG. 10.

Note that the execution interval and execution timing of the loop process illustrated in FIG. 10 can be arbitrarily set. The control circuit 20 may execute the loop process illustrated in FIG. 10 once or more at the timing when the process(es) of the command(s) from the host 2 is not carried out. The control circuit 20 may execute the loop process illustrated in FIG. 10 at a predetermined time interval.

Figure 11:
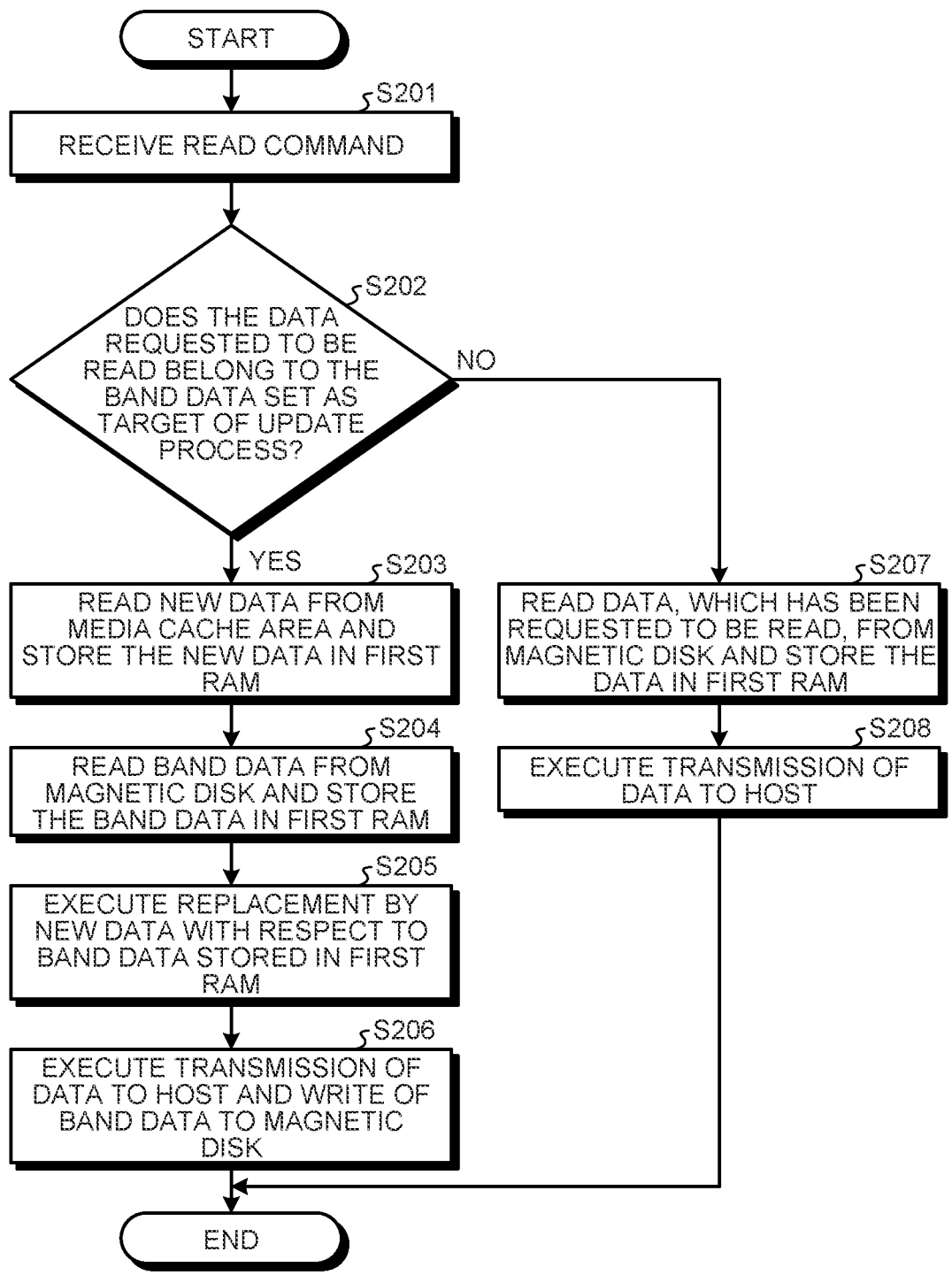
FIG. 11 is a flow chart illustrating an example of a series of operations according to the shared read operation executed by the magnetic disk apparatus according to the embodiment.

FIG. 11 is a flow chart illustrating an example of a series of operations according to the shared read operation executed by the magnetic disk apparatus 1 according to the embodiment.

When a read command is received from the host 2 (S201), the control circuit 20 determines whether the data requested to be read by the read command belongs to the band data set as the target of the update process or not (S202).

If the data requested to be read belongs to the band data set as the target of the update process (S202: Yes), the control circuit 20 reads new data, which is to rewrite the band data, from the media cache area 120 and stores the new data in the first RAM 24 (S203).

Subsequently, the control circuit 20 reads the band data from the magnetic disk 10 and stores the band data in the first RAM 24 (S204). More precisely, the control circuit 20 acquires two pieces of band data including the original band data by copying the band data, which has been read from the magnetic disk 10. Then, the control circuit 20 stores one of the two pieces of band data in the first buffer area 241 and stores the other one of the two pieces of band data in the second buffer area 242.

The control circuit 20 executes replacement by the new data with respect to each piece of the band data stored in the first RAM 24 (S205). In other words, the control circuit 20 executes update with respect to each piece of the band data stored in the first RAM 24.

Then, the control circuit 20 executes transmission of data to the host 2 and write of the band data to the magnetic disk 10 (S206). In S206, the control circuit 20 transmits the data of the part, which is in the band data in the first buffer area 241 and has been requested to be read, to the host 2. Also, the control circuit 20 writes the band data in the second buffer area 242 to one of the bands 130 in the magnetic disk 10. Then, the series of the operations is completed.

If the data requested to be read does not belong to band data set as a target of the update process (S202: No), the control circuit 20 reads the data, which has been requested to be read, from the magnetic disk 10 and stores the read data in the first RAM 24 (more specifically, the first buffer area 241) (S207). Then, the control circuit 20 transmits the data in the first RAM 24 to the host (S208). Then, the series of the operations is finished.

Figure 12:
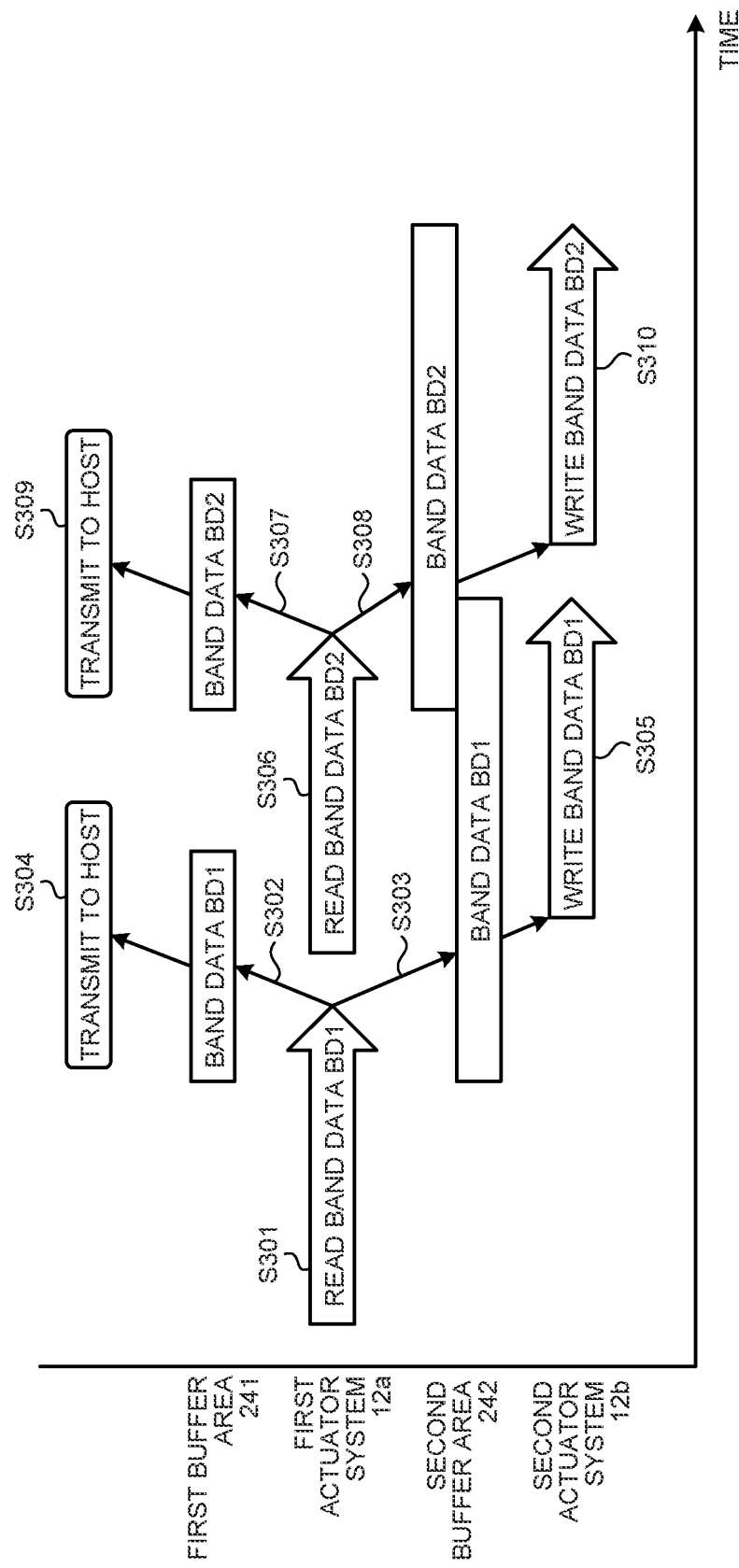
FIG. 12 is a schematic diagram for describing an example of operations of the magnetic disk apparatus according to the embodiment.

FIG. 12 is a schematic diagram for describing an example of operations of the magnetic disk apparatus 1 according to the embodiment. This diagram illustrates data stored in the first buffer area 241, data stored in the second buffer area 242, contents of operations using the first actuator system 12a, and contents of operations using the second actuator system 12b. Note that a horizontal axis illustrates the elapsed time based on the point of time of start of host read (in other words, the point of time of reception of a read command).

In the example illustrated in FIG. 12, it is assumed that both band data BD1 and band data BD2 are the data requested to be read and that the band data BD1 and the band data BD2 are recorded in the first magnetic disk 10a.

First, the control circuit 20 reads the band data BD1 from the first magnetic disk 10a by using the first actuator system 12a (S301). The control circuit 20 makes two copies of the band data BD1 read from the first magnetic disk 10a, stores one copy of the band data BD1 in the first buffer area 241 (S302), and stores the other copy of the band data BD1 in the second buffer area 242 (S303). The control circuit 20 transmits the band data BD1 in the first buffer area 241 to the host 2 after carrying out replacement by new data (S304). Also, the control circuit 20 writes the band data BD1 in the second buffer area 242 to an arbitrary unused band 130 of the second magnetic disk 10b by using the second actuator system 12b after carrying out replacement by new data (S305). The control circuit 20 retains the band data BD1 in the second buffer area 242 until the write of the band data BD1 to the second magnetic disk 10b is completed.

When the read (S301) of the band data BD1 using the first actuator system 12a is finished, the control circuit 20 reads the band data BD2 from the first magnetic disk 10a by using the first actuator system 12a (S306). The first actuator system 12a and the second actuator system 12b can be independently driven. Therefore, the process of S306 is executed in parallel to the process of S305. Note that the expression "a process N and a process M are executed in parallel to each other" means that an execution period of the process N and an execution period of the process M are overlapped with each other at least partially.

The control circuit 20 makes two copies of the band data BD2 read from the second magnetic disk 10b, stores one copy of the band data BD2 in the first buffer area 241 (S307), and stores the other copy of the band data BD2 in the second buffer area 242 (S308). The control circuit 20 transmits the band data BD2 in the first buffer area 241 to the host 2 after carrying out replacement by new data (S309). Also, the control circuit 20 writes the band data BD2 in the second buffer area 242 to an arbitrary unused band 130 of the second magnetic disk 10b by using the second actuator system 12b after carrying out replacement by new data (S310). The control circuit 20 retains the band data BD2 in the second buffer area 242 until the write of the band data BD2 to the second magnetic disk 10b is completed.

In this manner, in the magnetic disk apparatus 1 according to the embodiment, the control circuit 20 can execute, in parallel to each other, the write (for example, S305) to the magnetic disk 10 for the update process of one piece of band data using one of the actuator systems 12 and the shared read operation (for example, S306) of another piece of band data using the other one of the actuator systems 12.

Also, the control circuit 20 can execute, in parallel, the transmission of certain band data stored in the first RAM 24 to the host 2 (for example, S304) and the write of the same band data as this band data to the magnetic disk 10 (for example, S305).

The write of the band data to the magnetic disk 10 fails in some cases. The control circuit 20 checks whether the data can be correctly read or not by carrying out read of the data of the track, which has undergone narrowing of the track pitch, every time a predetermined amount of data (for example, data corresponding to one track) is written to the magnetic disk 10. If the data is not correctly read, the write of the data is assumed to be failure. Note that the patterns of failure of data write are not limited thereto. When write of one piece of band data to the magnetic disk 10 fails, the control circuit 20 retries the write of this band data to the magnetic disk 10.

Figure 13:
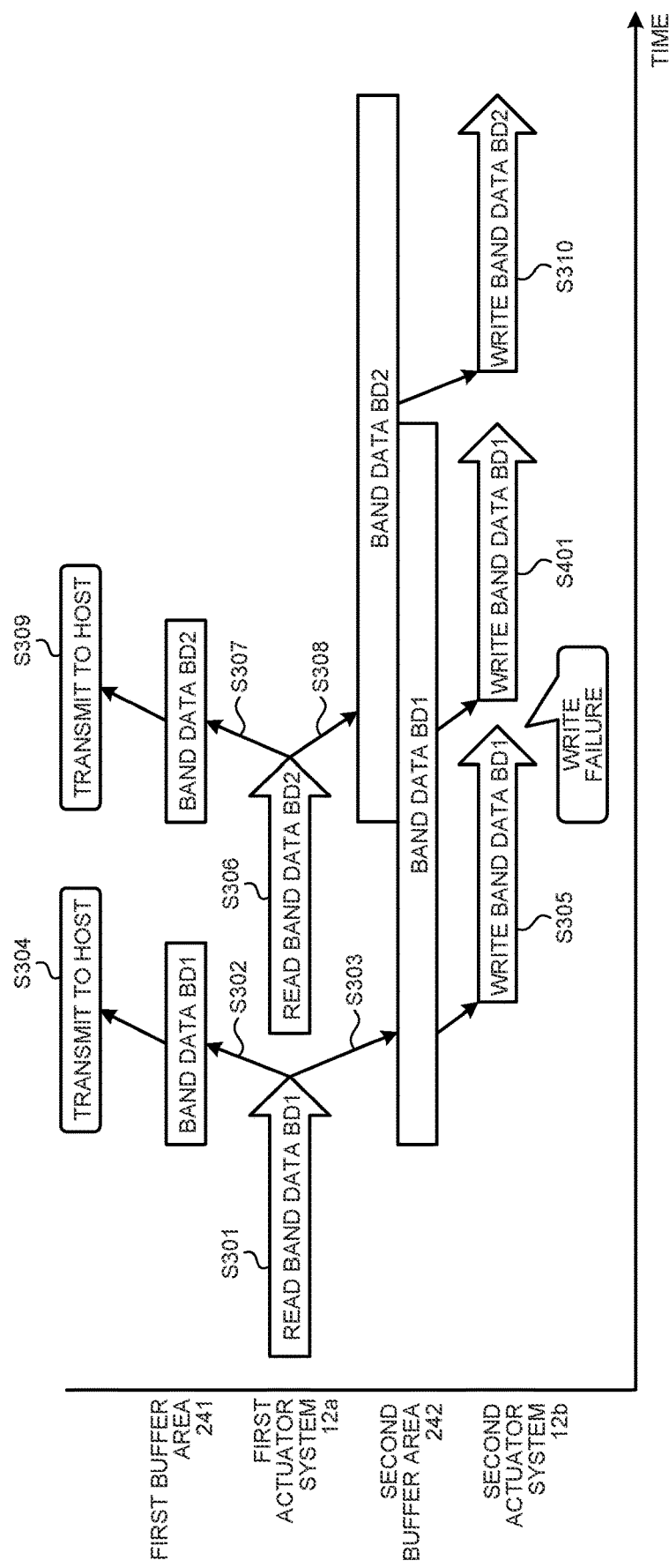
FIG. 13 is a schematic diagram for describing an example of operations in a case in which the magnetic disk apparatus according to the embodiment fails write of the band data.

FIG. 13 is a schematic diagram for describing an example of operations in a case in which the magnetic disk apparatus 1 according to the embodiment fails write of the band data BD1. In this diagram, the operations same as the operations illustrated in FIG. 12 are denoted by the same step numbers as FIG. 12. Also, regarding the operations same as the operations illustrated in FIG. 12, descriptions are omitted, or descriptions are simplified.

First, the control circuit 20 executes the processes of S301 to 304 as in the example illustrated in FIG. 12. Then, the control circuit 20 writes the band data BD1 in the second buffer area 242 to an arbitrary unused band 130 of the second magnetic disk 10b by using the second actuator system 12b after carrying out replacement by new data (S305).

When the write of the band data BD1 to the second magnetic disk 10b fails in S305, the control circuit 20 retries the write of the band data BD1 to the second magnetic disk 10b (S401). In S401, the control circuit 20 writes the band data BD1, which has been retained in the second buffer area 242 without being erased, to the second magnetic disk 10b. The band 130 of a write destination may be the band 130 used as the write destination in S305 or may be another arbitrary unused band 130. The control circuit 20 retains the band data BD1 in the second buffer area 242 until the write of the band data BD1 to the first magnetic disk 10a is completed.

When the read (S301) of the band data BD1 using the first actuator system 12a is finished, the control circuit 20 reads the band data BD2 from the first magnetic disk 10a by using the first actuator system 12a (S306). The process of S306 can be executed in parallel to the process of S305 or the process of S401.

The control circuit 20 executes the processes of S307 to S309 after S306. Also, after the process of S401 is completed, the control circuit 20 writes the band data BD2, which is in the second buffer area 242, to the second magnetic disk 10b by using the second actuator system 12b (S310). The band data BD2 can be written to an arbitrary unused band 130. The control circuit 20 executes the write of the band data BD2 after carrying out replacement by new data. The control circuit 20 retains the band data BD2 in the second buffer area 242 until the write of the band data BD2 to the second magnetic disk 10b is completed.

In this manner, in the magnetic disk apparatus 1 according to the embodiment, the control circuit 20 retains the band data in the second buffer area 242 until the write of the band data to the magnetic disk 10 is completed. Therefore, even when the write of the band data to the magnetic disk 10 fails, the control circuit 20 can retry the write of the band data to the magnetic disk 10.

The band data is retained in the second buffer area 242 until the write to the magnetic disk 10 is completed. Therefore, when the transmission of the data to the host 2 is completed, the band data in the first buffer area 241 becomes unnecessary. The control circuit 20 disables the band data in the first buffer area 241 which has become unnecessary and can use the area in the first buffer area 241, in which the band data has been stored, to store different band data.

Note that, in the above descriptions, in the first RAM 24, the first buffer area 241 used for the host read and the second buffer area 242 used in the update process are individually provided. One buffer area may be shared by the host read and the update process. Hereinafter, the technique of sharing one buffer area by the host read and the update process will be described as a modification example of the embodiment.

Figure 14:
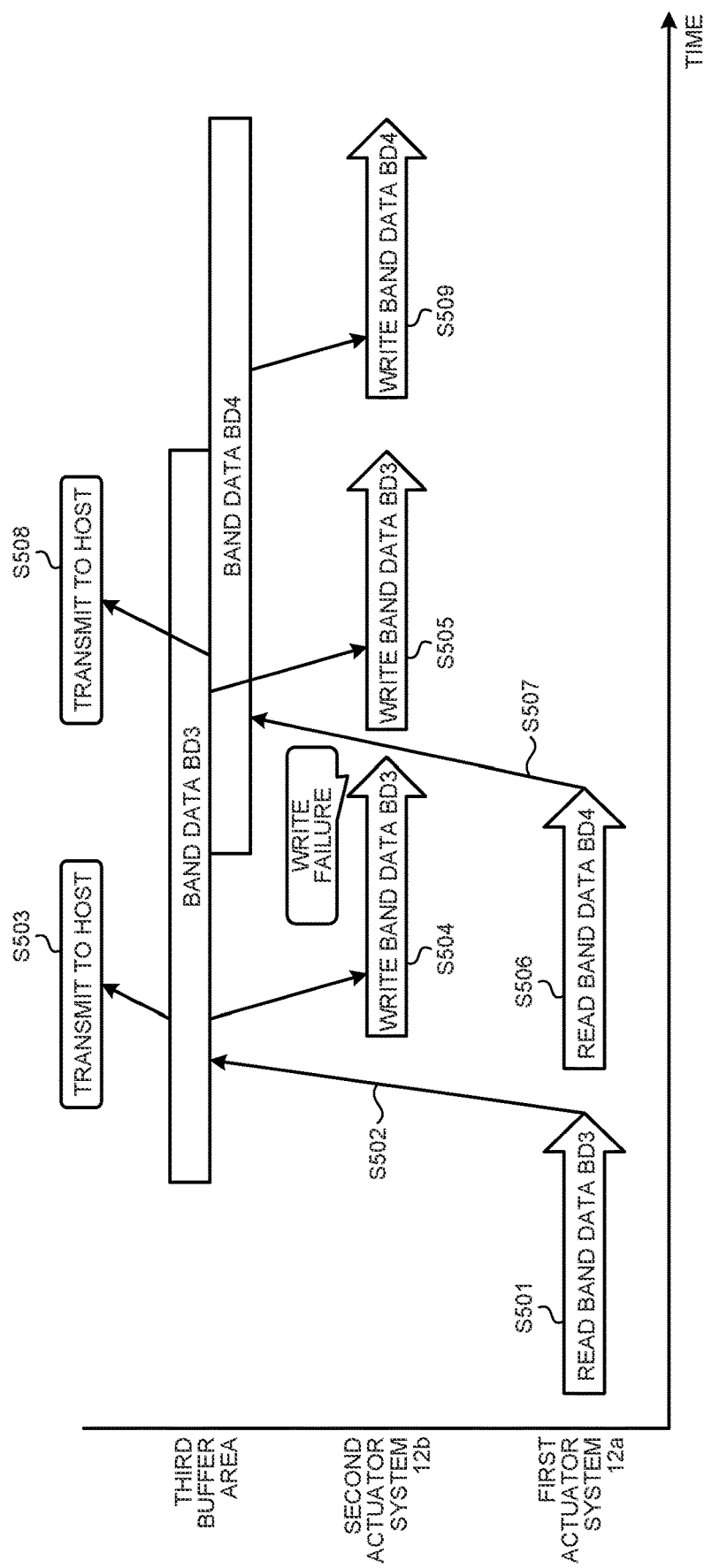
FIG. 14 is a schematic diagram for describing an example of operations of the magnetic disk apparatus according to a modification example the embodiment.

FIG. 14 is a schematic diagram for describing an example of operations of the magnetic disk apparatus 1 according to a modification example the embodiment. A buffer area in the first RAM 24, which is shared by the host read and the update process, is described as a third buffer area. This diagram illustrates data stored in the third buffer area, contents of operations using the first actuator system 12a, and contents of operations using the second actuator system 12b. Note that, as in FIG. 12 and FIG. 13, a horizontal axis illustrates the elapsed time based on the point of time of start of host read (in other words, the point of time of reception of a read command).

Also, in the example illustrated in FIG. 14, it is assumed that both band data BD3 and band data BD4 are the data requested to be read and that the band data BD3 and the band data BD4 are recorded in the first magnetic disk 10a.

First, the control circuit 20 reads the band data BD3 from the first magnetic disk 10a by using the first actuator system 12a (S501). The control circuit 20 stores the band data BD3, which has been read from the first magnetic disk 10a, in the third buffer area (S502). The control circuit 20 transmits the band data BD3 in the third buffer area to the host 2 after carrying out replacement by new data (S503). Also, the control circuit 20 writes the band data BD3, which has undergone replacement by new data and is in the third buffer area, to an arbitrary unused band 130 of the second magnetic disk 10b by using the second actuator system 12b (S504). The control circuit 20 retains the band data BD3 in the third buffer area until the write of the band data BD3 to the first magnetic disk 10a is completed.

When the write of the band data BD3 to the second magnetic disk 10b fails in S504, the control circuit 20 retries the write of the band data BD3 to the second magnetic disk 10b (S505). In S505, the control circuit 20 writes the band data BD3, which has been retained in the third buffer area without being erased, to the second magnetic disk 10b. The band 130 of a write destination may be the band 130 used as the write destination in S504 or may be another arbitrary unused band 130.

After the read (S501) of the band data BD3 using the first actuator system 12a is completed, the control circuit 20 reads the band data BD4 from the first magnetic disk 10a by using the first actuator system 12a (S506). The first actuator system 12a and the second actuator system 12b can be independently driven. Therefore, the process of S506 can be executed in parallel to the process of S504 or the process of S505.

The control circuit 20 stores the band data BD4, which has been read from the second magnetic disk 10b, in the third buffer area (S507). Then, the control circuit 20 transmits the band data BD4 in the third buffer area to the host 2 after carrying out replacement by new data (S508). Also, after the write (S505) of the band data BD3 using the second actuator system 12b is completed, the control circuit 20 writes the band data BD4, which has undergone replacement by new data and is in the third buffer area, to an arbitrary unused band 130 of the second magnetic disk 10b by using the second actuator system 12b (S509).

In this manner, to the first RAM 24 as a buffer memory, dedicated areas respectively for the host read and the update process may be allocated, or one area shared by the host read and the update process may be allocated.

Note that, in the embodiment and the modification example thereof, the control circuit 20 specifies the band 130, which serves as an update target, in advance by the operation described by using FIG. 10 before the read command is received from the host 2. The process of specifying the band 130, which serves as the update target, may be executed after the read command is received. In other words, when the read command is received, the control circuit 20 may determine whether the band data to which the data requested to be read by the read command satisfies the condition to execute the update process or not.

In the description described above, the magnetic disk apparatus 1 provided with the two actuator systems 12a and 12b has been described as an example. The shared read operation according to the embodiment can be realized as long as the number of the actuator systems provided in the magnetic disk apparatus is one or more.

More specifically, if the data requested to be read by the host is the data (described as first data), which is stored in a certain band (described as a first band) among plural bands and has been determined to be updated, the control circuit reads the first data, which is stored in the first band, by using one of the one or more actuator systems and stores the first data in the buffer memory. The control circuit updates the first data in the buffer memory. The control circuit transmits the data, which is in the first data in the buffer memory and has been requested to be read by the host, to the host and writes the first data, which is in the buffer memory, to one of the plural bands by using one of the one or more actuator systems.

Therefore, compared with a case in which the read of data from the magnetic disk for host read and the read of data from the magnetic disk for the update process are individually executed, the number of times of read of data from the magnetic disk is reduced. In other words, the efficiency of the read of data from the magnetic disk can be improved.

If the magnetic disk apparatus is provided with two or more actuator systems, the magnetic disk apparatus can further execute, for example, the process of S305 and the process of S306 of FIG. 12 in parallel.

More specifically, if the data requested to be read is the first data and the data (described as second data), which is stored in another band (described as a second band) among the plural bands and has been determined to be updated, the control circuit writes the first data in the buffer memory to one band among the plural bands by using one actuator system (described as a third actuator system) among the plural actuator systems. Then, in parallel to the write of the first data using the third actuator system, the control circuit reads the second data from the second band by using a fourth actuator system, which is different from the third actuator system among the plural actuator systems, and stores the second data in the buffer memory.

Therefore, by utilizing the two actuator systems, as many execution periods of the update process as possible can be overlapped with the execution period of the host read. In other words, the magnetic disk apparatus can execute the update process efficiently.

Also, for example as illustrated in FIG. 4, the magnetic disk apparatus can be provided with a buffer memory to which the first buffer area for host read and the second buffer area for the update process of band data are individually allocated.

In such a case, the control circuit retains the band data in the second buffer area until the write of the band data is completed. If the write of the band data fails, the control circuit retries the write of the band data by using the band data retained in the second buffer area.

Also, in the magnetic disk apparatus according to the embodiment, the band data stored in the buffer memory by the shared read operation is transmitted to the host and is also written to the magnetic disk. The control circuit can execute, in parallel, the transmission of the band data, which is stored in the buffer memory, to the host and the write to the magnetic disk.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
a magnetic disk having plural bands, each band serving as a storage area to which data is written by a Shingled Magnetic Recording (SMR) method;
a buffer memory; and
a control circuit configured to
receive a request of read from outside and,
when data requested to be subjected to the read is first data of an update target stored in a first band among the plural bands, read the first data from the first band, stores the first data in the buffer memory, update the first data in the buffer memory, transmit the first data in the buffer memory to the outside, and write the first data in the buffer memory to one of the plural bands, wherein
the magnetic disk apparatus further comprises plural actuator systems, each actuator system provided with a magnetic head at a distal end, wherein,
the control circuit is configured to,
when the data requested to be subjected to the read is the first data and second data of an update target, the second data being stored in a second band different from the first band among the plural bands,
write the first data in the buffer memory to one band among the plural bands by using a first actuator system that is one actuator system among the plural actuator systems, and,
in parallel to the write of the first data using the first actuator system, read the second data from the second band by using a second actuator system that is different from the first actuator system among the plural actuator systems and store the second data in the buffer memory, wherein
the buffer memory is provided with a first buffer area and a second buffer area; and
the control circuit is configured to copy the first data read from the first band to acquire two pieces of the first data, store third data serving as one of the two pieces of the first data in the first buffer area, store fourth data serving as another one of the two pieces of the first data in the second buffer area, transmit the third data in the first buffer area to the outside, and write the fourth data in the second buffer area to one band among the plural bands.

2. The magnetic disk apparatus according to claim 1, wherein,
the control circuit is configured to retry the write of the fourth data when the write of the fourth data fails and retain the fourth data in the second buffer area until the write of the fourth data is completed.

3. A magnetic disk apparatus comprising:
a magnetic disk having plural bands, each band serving as a storage area to which data is written by a Shingled Magnetic Recording (SMR) method;
a buffer memory; and
a control circuit configured to
receive a request of read from outside and,
when data requested to be subjected to the read is first data of an update target stored in a first band among the plural bands, read the first data from the first band, stores the first data in the buffer memory, update the first data in the buffer memory, transmit the first data in the buffer memory to the outside, and write the first data in the buffer memory to one of the plural bands
the buffer memory is provided with a first buffer area and a second buffer area; and
the control circuit is configured to copy the first data read from the first band to acquire two pieces of the first data, store third data serving as one of the two pieces of the first data in the first buffer area, store fourth data serving as another one of the two pieces of the first data in the second buffer area, transmit the third data in the first buffer area to the outside, and write the fourth data in the second buffer area to one band among the plural bands.

4. The magnetic disk apparatus according to claim 3, wherein,
the control circuit is configured to retry the write of the fourth data when the write of the fourth data fails and retain the fourth data in the second buffer area until the write of the fourth data is completed.

5. A method of controlling a magnetic disk apparatus, the method comprising:
receiving a request of read from outside; and,
when data requested to be subjected to the read is first data of an update target stored in a first band among plural bands serving as a storage area, each band being possessed by a magnetic disk and to be subjected to write of data by a Shingled Magnetic Recording method, reading the first data from the first band, storing the first data in the buffer memory, updating the first data in the buffer memory, transmitting the first data in the buffer memory to the outside, and writing the first data in the buffer memory to one of the plural bands, wherein
the magnetic disk apparatus is provided with plural actuator systems, each actuator system being provided with a magnetic head at a distal end; and,
when the data requested to be subjected to the read is the first data and second data of an update target, the second data being stored in a second band different from the first band among the plural bands, the method further comprises
writing the first data in the buffer memory to one band among the plural bands by using a first actuator system that is one actuator system among the plural actuator systems, and, in parallel to the write of the first data using the first actuator system, reading the second data from the second band by using a second actuator system that is different from the first actuator system among the plural actuator systems and storing the second data in the buffer memory, wherein
the buffer memory is provided with a first buffer area and a second buffer area; and
the method further comprises
copying the first data read from the first band to acquire two pieces of the first data, storing third data serving as one of the two pieces of the first data in the first buffer area, storing fourth data serving as another one of the two pieces of the first data in the second buffer area, transmitting the third data in the first buffer area to the outside, and writing the fourth data in the second buffer area to one band among the plural bands.

6. The method according to claim 5, further comprising:
retrying the write of the fourth data when the write of the fourth data fails, and
retaining the fourth data in the second buffer area until the write of the fourth data is completed.

7. A method of controlling a magnetic disk apparatus, the method comprising:
receiving a request of read from outside; and
when data requested to be subjected to the read is first data of an update target stored in a first band among plural bands serving as a storage area, each band being possessed by a magnetic disk and to be subjected to write of data by a Shingled Magnetic Recording method, reading the first data from the first band, storing the first data in the buffer memory, updating the first data in the buffer memory, transmitting the first data in the buffer memory to the outside, and writing the first data in the buffer memory to one of the plural bands
wherein
the buffer memory is provided with a first buffer area and a second buffer area; and
the method further comprises
copying the first data read from the first band to acquire two pieces of the first data, storing third data serving as one of the two pieces of the first data in the first buffer area, storing fourth data serving as another one of the two pieces of the first data in the second buffer area, transmitting the third data in the first buffer area to the outside, and writing the fourth data in the second buffer area to one band among the plural bands.

8. The method according to claim 7, further comprising:
retrying the write of the fourth data when the write of the fourth data fails, and
retaining the fourth data in the second buffer area until the write of the fourth data is completed.

* * * * *